Figure 1:
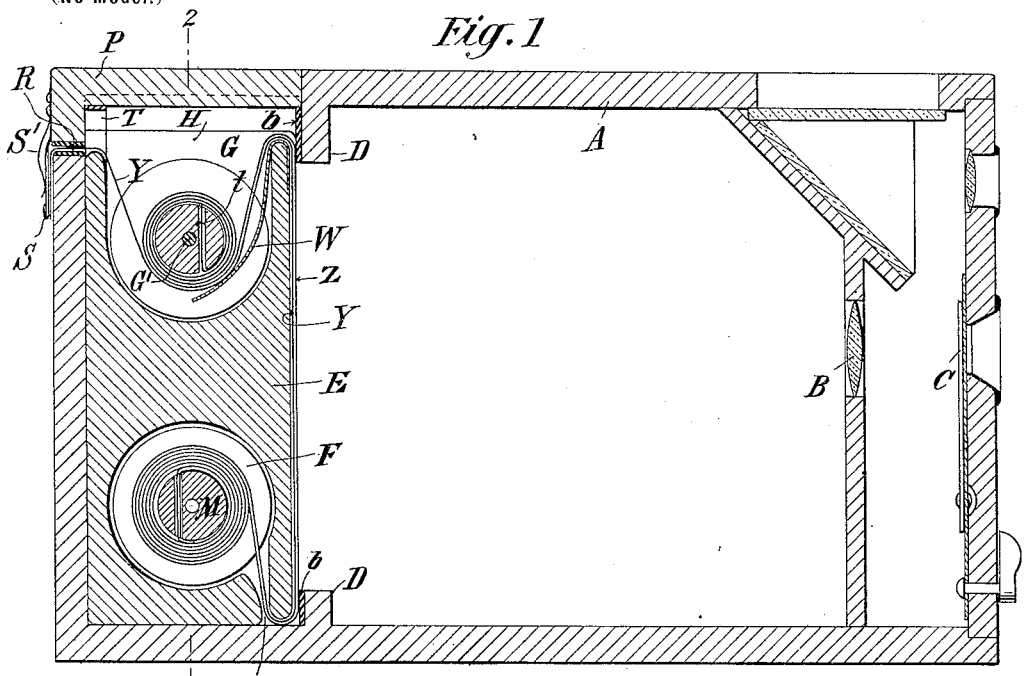

No. 607,428. Patented July 19, 1898.
W. V. ESMOND.
ROLL HOLDING CAMERA.
(Application filed Oct. 25, 1897.)
(No Model.)

Witnesses:
Raphael Netter
Benjamin Mueller

William V. Esmond Inventor
by Kerr, Curtis & Page
Attys.

United States Patent Office.

WILLIAM V. ESMOND, OF NEW YORK, N. Y., ASSIGNOR TO MAXIMILIAN KAHN, OF SAME PLACE.

ROLL-HOLDING CAMERA.

SPECIFICATION forming part of Letters Patent No. 607,428, dated July 19, 1898.

Application filed October 25, 1897. Serial No. 656,292. (No model.)

*To all whom it may concern:*

Be it known that I, WILLIAM V. ESMOND, a citizen of the United States, residing at New York, in the county and State of New York, have invented certain new and useful Improvements in Photographic Cameras, of which the following is a specification, reference being had to the drawings accompanying and forming a part of the same.

In those photographic cameras heretofore constructed in which provision is made for the employment of a continuous flexible film or sensitized surface two reels or spools are always employed, one designed for carrying the unexposed film and the other for receiving the film as it is unwound from the first and drawn across the field of exposure. In all such cameras, so far as I am aware, the transfer of the film from the original to the receiving reel, spool, spindle, or whatever device of this nature may be employed is effected by the rotation of a spindle or analogous device secured, connected, or geared with one or both spools and projecting through the side or top of the camera, where it is usually provided with some device in the nature of a handle or wing-nut for its convenient manipulation. The mechanical appliances—such as pawls, ratchets, and screws—which such a means of moving the film involves are objectionable on several accounts, mainly by reason of the fact that they are subject to constant wear and liable to disarrangement.

The primary object of my present invention is to simplify the construction of such cameras and to dispense with all such mechanical appliances as have been heretofore employed for revolving the spools or reels and to effect the transfer of the film from the original to the receiving reel or spool under conditions which permit of its proper exposure in the focus of the lens by means of a flexible strip or band which is wound on the original reel or spool with the unexposed film and caused to impart motion to the other reel or spool when drawn out through a suitable slot or opening in the box or casing of the camera.

In this construction or combination, broadly, my present invention resides, and it will be understood that the special device exhibited in the drawings and by means of which I have illustrated the nature of the improvement is merely given as the best and most practicable embodiment of the invention of which I am aware.

Figure 2:
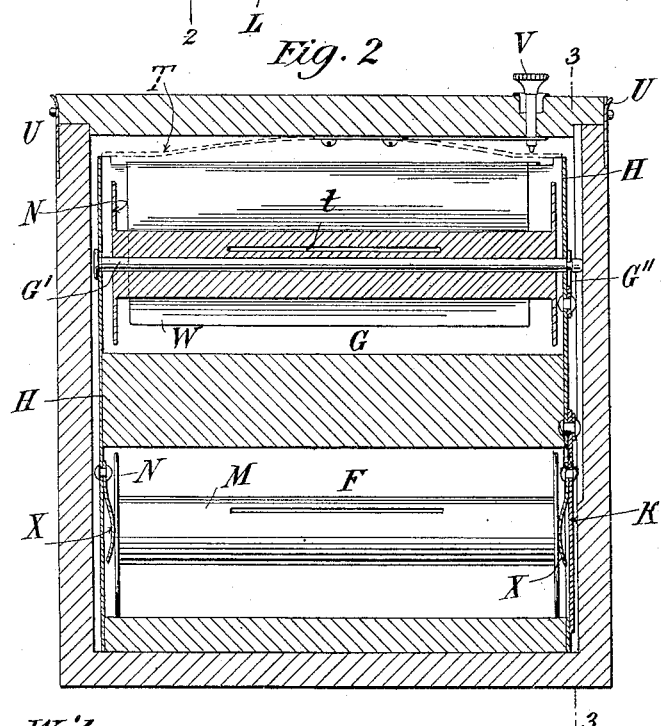
Figure 3:
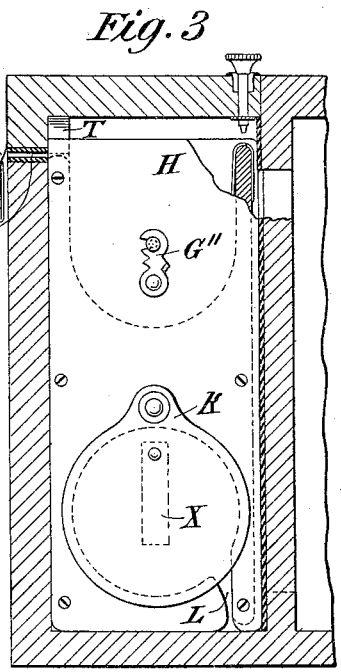

In the drawings hereto annexed, Figure 1 is a longitudinal section of a camera provided with my improved roll-holder. Fig. 2 is a transverse section of the same on line 2 2 of Fig. 1, and Fig. 3 is an end view of the roll-holder with the box or case in section on the line 3 3 of Fig. 2.

The camera as a whole may vary greatly in character and construction, the improved roll-holder being applicable generally to any form of camera in which the employment of a continuous film is permissible.

In the drawings, A is the box or case, B the lens, and C the shutter.

In the rear portion of the box or case A are ribs or flanges D, which extend around the sides of the box and form abutments for the roll-holder E. The surfaces of these ribs are covered with strips of velvet or felt $b$. This roll-holder consists, preferably, of a simple wooden block having a circular chamber F bored through its lower portion and an open recess or groove G at its top.

To the ends of the block E are secured sheet-metal plates H H, which cover the openings of the receptacles F G.

In the plate H at one end of the block is a circular opening to permit a roll of film to be inserted into the receptacle F, and said opening is closed by a disk or plate K, pivoted to the plate H.

In the bottom of the block E and extending entirely across the same is a slot L, which reaches to the chamber or receptacle F and affords a passage through which the film is drawn from the said chamber.

The rolls of film may be of any ordinary description. For example, a wooden cylinder M with sheet-metal ends N is used as a spool, upon which a strip of film and a strip of paper or any fabric are wound together in the usual manner.

The end of the box or case which contains the roll-holder is provided with a hinged lid P, which when closed effectually excludes the light. The meeting edges of the lid and case in the rear of the latter are covered with strips of velvet or felt, so as to afford a light-proof slot R, through which a strip of paper or other thin fabric may be drawn.

Depending from the lid P over the slot R is a flexible flap S, to the edge of which is secured in any suitable manner a strip of metal or other material with sufficient rigidity to constitute a cutting edge, and some device, such as a flat spring S', attached to the lid P and bearing on or incorporated with the flap, is preferably employed to hold the flap tightly against the box over the slot.

On the roll-holder or the lid, but intermediate thereto, is a spring-strip T, which is compressed when the lid is closed and serves to prevent jarring and displacement of the holder. Any suitable form of catch, as U, is employed to keep the lid closed.

V is a spring-seated punch or marker placed in the lid directly over the upper forward rounded edge of the roll-holder and near one end of the same and is used to mark the film by indenting it to indicate the division-lines between successively-exposed portions.

To use the device, the roll-holder is withdrawn from the box, an empty film-spool placed in the recess G, and a full spool in the chamber F. The receiving-spool is supported in the recess G by a spindle G', which is passed through holes in the metal ends H and secured by a suitable catch G''. When this spool is in position, a spring-plate W, secured to the block E, bears upon it for the purpose hereinafter described. The full or original spool is simply inserted in the chamber F, where it is held against undue movement by spring-blocks X, secured in the ends of the said chamber. After the spools have been inserted in place the end of the paper or strip of fabric Y, together with the end of the film-strip Z, are drawn through the slot L, carried across the flat face of the block, over the upper edge of the same, and under the empty spool in the recess G between the same and the spring W. The end of the film-strip is then secured to the spool, as by inserting it in a slot $t$ therein, while the paper strip is drawn off over the rear edge of the block, so that when the latter is inserted in the camera and the lid closed the end of the paper will extend through the slot R. It will be understood that the ends of the film-strip are of some opaque and non-sensitized material, such as black paper, and when the camera has been "loaded" as above described the paper strip Y is drawn out through the slot R until an arbitrary mark thereon is exposed, which indicates that the film has been brought into the field of exposure. The unwinding of the paper strip Y unwinds the film-strip also, while the movement of the paper strip around the receiving-spool and the pressure of the spring X thereon causes the said spool to turn and winds up the film. After an exposure the paper strip is drawn out through the slot R until a mark is exposed which indicates that the proper length of unexposed film has been unwound. The end of the paper strip is then cut off by pulling it against the cutting edge of the flap S. As this edge is below the slot R the paper strip may always be grasped by the fingers for drawing it out by lifting up the flap S. After all of the film has been exposed the paper strip is drawn out until the former is wound over the receiving-spool and protected by a sufficient number of turns of its opaque end, when the holder may be removed for the insertion of a new roll.

The construction of the device and the conditions under which it is operated contribute to securing the best practical results. The film is properly stretched in exact focus and light is perfectly excluded. The mechanism is, moreover, extremely simple, durable, and inexpensive.

What I claim is—

1. The combination with the box or case of a camera, of a roll-holder having means for supporting a spool or reel of sensitized film, and a spool or reel for receiving the film as unwound, the said roll-holder being formed or provided with a guide or path for the passage of the film and a flexible strip through which path the said flexible strip may be drawn in frictional contact with the receiving-spool, so as to impart rotary movement thereto, and to and through a slot in the case of the camera, as set forth.

2. The combination with the box or case of a camera, of a means for transferring the film from the original to the receiving spool or roll, the said means consisting of a roll-holder constructed or provided with a guide or path for the film and a flexible strip or band, through which path the said strip or band may be drawn in frictional contact with the receiving-spool so as to impart rotary motion thereto, and to and through a slot in the case of the camera, as set forth.

3. The combination with the box or case of a camera of means for supporting a spool or reel carrying a sensitized film, and a receiving spool or reel for said film, means for directing the course of the film and a flexible strip from the original spool through the field of exposure to the receiving-roll, and a spring adapted to press the flexible strip in contact with the receiving-roll, the case of the camera being provided with a slot through which the flexible strip may be drawn after passing in contact with the receiving-reel, as set forth.

4. The combination with the box or case of a camera, of means for supporting the original and receiving film spools or reels therein, means for directing the film and a flexible strip or band from the original to the receiving spool or reel, and directing the said flexible strip or band in frictional contact with the receiving spool or reel to a slot in the camera-case, and a hinged flap covering the said slot, as set forth.

5. The combination with the box or case of a camera, of means for supporting the original and receiving film spools or reels therein, means for directing the film and a flexible strip or band from the original to the receiving spool or reel and directing the said flexible strip or band in frictional contact with the receiving spool or reel to a slot in the camera-case, and a hinged flap provided with a rigid cutting edge, and covering the said slot, as set forth.

6. The combination with the box or case of a camera, of means for supporting the original and receiving film spools or reels therein, means for directing the film and a flexible strip or band from the original to the receiving spool or reel, and directing the flexible strip or band in frictional contact with the receiving spool or reel to a slot in the camera-case, a hinged flap covering the said slot and a spring acting therein to keep the slot closed or covered by said flap, as set forth.

7. The combination with the case or box of a camera of a roll-holder consisting of a block, having a recess for a roll of film, a slot leading from the same for the passage of the film, a recess for the receiving spool or reel, and a flat surface over which the film passes in its movement from one reel or spool to the other through the field of exposure, as set forth.

8. The combination with the box or case of a camera having a hinged lid and a slot for the passage of a paper band or strip, of a roll-holder adapted to be inserted in and withdrawn from the said case, means for supporting the original and receiving spools or reels therein, and formed with a guide or path through which a paper strip wound on the original reel with the film may be drawn in frictional contact with the receiving-reel, so as to impart rotary movement thereto, as set forth.

9. The combination with the camera-case having a slot for the passage of a paper band or strip, of a roll-holder provided with means for directing a paper strip from the original reel to the said slot and in frictional contact with the receiving-reel and a punch or marker set in the wall of the case at a point near the edge of the field of exposure, as set forth.

WILLIAM V. ESMOND.

Witnesses:
M. LAWSON DYER,
EDWIN B. HOPKINSON.